United States Patent [19]

Schulze

[11] 4,003,527
[45] Jan. 18, 1977

[54] CONTROL MEANS FOR ROLL SHEET FEEDER

[75] Inventor: John Jacob Schulze, Prospect Heights, Ill.

[73] Assignee: Addressograph Multigraph Corporation, Cleveland, Ohio

[22] Filed: Oct. 1, 1975

[21] Appl. No.: 619,145

[52] U.S. Cl. ............................... 242/58; 242/56 R; 242/67.3 R; 226/92; 226/110
[51] Int. Cl.[2] .................. B65H 19/08; B65H 19/20; B65H 17/42
[58] Field of Search .................. 242/55, 56 R, 67.2, 242/67.3 R, 58; 226/110, 139–143, 92

[56] References Cited

UNITED STATES PATENTS

| 3,688,961 | 9/1972 | Becker | 226/92 |
| 3,850,356 | 11/1974 | Abe et al. | 226/110 |
| 3,880,372 | 4/1975 | Witte | 242/55 |

*Primary Examiner*—Leonard D. Christian
*Attorney, Agent, or Firm*—Michael A. Kondzella; Sol L. Goldstein

[57] ABSTRACT

A control means is provided for use with a roll sheet feeder in which a web is fed to a work station from either one of a pair of web supply rolls for partially withdrawing from the work station the web not being fed thereto to avoid interference with the other web being worked upon at the work station. First and second selectively driven rotatable members are provided for feeding a web to the work station. The control means comprises a first and a second friction brake means mounted on and rotatable with the first and the second members respectively, and stop means for arresting rotation of the brake means. As the first member is rotated in a direction to feed the web to the work station, the brake means thereon co-acts with the brake means on the second member to thereby rotate the second brake means and the second member through a predetermined distance in the opposite or reverse direction until arrested by the stop means. This reverse rotation of the second member is effective to partially withdraw from the work station a lead end of the web associated with the second member.

5 Claims, 2 Drawing Figures

CONTROL MEANS FOR ROLL SHEET FEEDER

BACKGROUND OF THE INVENTION

Although the control means of the present invention may be used in various kinds of applications, it is particularly suited to an application wherein a web is selectively fed to a web severing or cutting station from either one of a pair of web supply rolls. The web not being severed is partially withdrawn from the cutting station to avoid severing a thin portion or sliver from the lead end thereof during the cutting of the other web.

More specifically, the present invention is adapted for use with an apparatus for feeding and cutting copy material from a roll in accordance with an original document fed into a contact-type copying machine as disclosed, for example, in U.S. Pat. No. 3,645,157.

As shown therein, the copy feeding and cutting apparatus comprises a paper cutting device mounted along a copy paper path of a copying machine. The operation of the cutting device is controlled in accordance with the actuation of a switching device disposed at a predetermined location along an original document feed path of the machine.

The single switch senses the leading edge of an original fed into the machine and in response thereto, actuates the feeding of copy paper along the copy paper path of the machine, which in turn is fed in synchronism with the movement of the original. The leading edges of the original and copy paper reach the nip of a pair of infeed rollers simultaneously and are carried thereby into the machine with the original superimposed on and in registration with the copy paper. In response to the trailing edge of the original passing the single switching device, the cutter is operated to sever from the web a copy sheet of a length equal to the original.

A second switch, preceding the above-mentioned switching device, is provided for determining the width of copy paper to be fed in the copying machine. If the original is of a width great enough to engage the second switch, circuitry is actuated to cause copy paper to be fed from a roll having a width to accommodate the original. If the width of the original is not great enough to engage the second switch, copy paper is fed from a roll of a lesser width.

While the foregoing apparatus has met with considerable success, it does not provide means for precluding consistently the cutting of a thin portion or sliver from the lead end of the roll of copy paper last fed to the cutting station when the alternate roll of copy paper is fed to and severed at the cutting station. These thin slivers cut from the web tend to adhere to the cut sheet fed into the copying machine and result in contaminating the copy sheet developer material, the feeder area and other portions of the apparatus.

SUMMARY OF THE INVENTION

It is an object of the present invention to provide a control means for use with a roll sheet feeder in which a web is fed to a work station from either one of a pair of web supply rolls, for partially withdrawing from the work station the web last fed thereto to avoid interference with the other web being worked upon at the work station.

A more specific object of the invention is to provide a friction brake means associated with each of the web supply rolls for retracting from a cutting station a lead end of the web last fed to the cutting station, thereby preventing the cutting of a sliver from the web last fed during the feeding and the severing of the alternate web.

A feature of the invention is to provide a control means which is inexpensive to produce, reliable in operation and which may be readily installed on existing machines.

The foregoing objects are attained by providing a control means comprising a friction brake means mounted on and rotatable with each of a pair of selectively operable feed rollers for advancing a web to a cutting station from either of two web supply rolls. As one of the feed rollers is rotated in a direction to feed a web to the cutting station, the brake means associated therewith co-acts with the brake means associated with the other feed roller, thereby rotating the brake means and the other feed roller through a predetermined angular distance in the opposite or reverse direction of rotation. The rotative movement of the other feed roller is arrested in response to the brake means thereon engaging a stop means. The reverse rotation imparted to the other feed roller is effective to partially withdraw from the cutting station the lead end of the web last fed to the cutting station.

Other objects, features and advantages of the invention will appear hereinafter as the description proceeds.

IN THE DRAWING

FIG. 1 is an end view of a control means, in association with a pair of web feed rollers, a pair of web supply rolls and a web cutting station, in accordance with the present invention; and FIG. 2 is a section taken on the line 2—2 of FIG. 1.

DESCRIPTION OF THE PREFERRED EMBODIMENT

Figure 1:
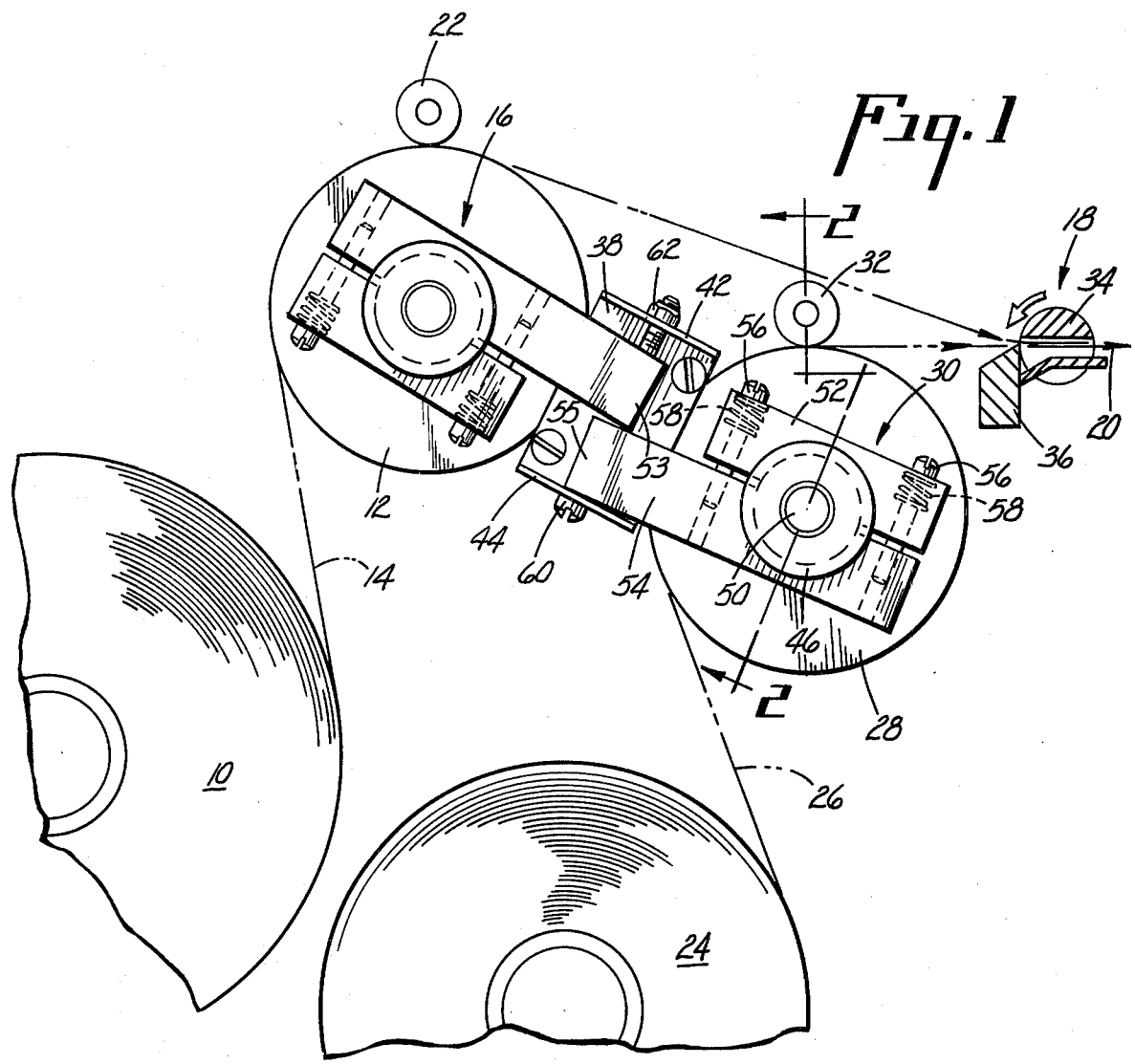

With reference to FIG. 1, there is shown a web supply roll 10 of diazotype paper, or the like, a feed roller 12 for advancing a web 14 from the supply roll 10, a control means indicated generally by the reference numeral 16 and a web cutting station indicated by the numeral 18. After the web 14 is severed at the cutting station 18, the cut sheet is fed into a copying machine in the direction of the arrow 20. The web 4 is held in contact engagement with the feed roller 12 by a guide roller 22 riding on the periphery of the feed roller 12.

A second web supply roll 24 is provided for supplying, for example, a web 26 of diazo-type paper of a width differing from the width of the web 14 to thereby provide for copying original documents of different widths. The supply roll 24 is associated with components corresponding with those described in connection with the supply roll 10 comprising a feed roller 28, a control means indicated generally by the reference numeral 30 and a guide roller 32 for maintaining the web 26 in contact engagement with the periphery of the feed roller 28.

The cutting station 18 comprises a rotary cutting member 34 and a stationary blade 36 such that a sheet is cut from either the web 14 or 26 in each revolution of the rotary cutting member 34.

As shown in the drawing, there is further provided a stop member 38 positioned intermediate the feed rollers 12 and 28 and mounted on a side plate 40. The stop member 38 is of generally U-shaped configuration comprising an upper and a lower flange 42 and 44 respectively, extending in a direction outwardly from the side plate 40.

Figure 2:
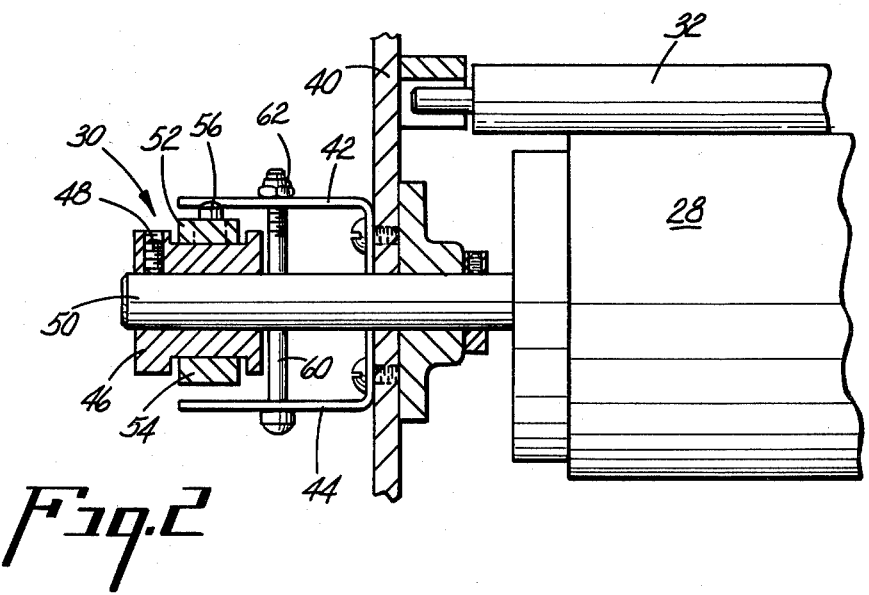

Because the control means 16 and 30 and their associated feed rollers 12 and 28 respectively, are the same in construction and operation, only one control means 30 will be described in detail hereinbelow. Thus, as best shown in FIG. 2, the control means 30 comprises a bushing 46 secured by fastening means 48 to a shaft 50 of the feed roller 28. A short and a long bearing block 52 and 54 respectively, are rotatably supported on the bushing 46. The bearing blocks 52 and 54 are held in place on the bushing 46, in spaced apart relation, by a pair of screws 56 passing through clearance holes in the bearing block 52 and in threaded engagement with tapped holes provided in the bearing block 54. The bearing block 52 is further provided with a pair of counter bore holes each retaining therein a compression spring 58 positioned under the head of each of the screws 56.

Thus, by adjusting the screws 56 relative to the springs 58, the bearing blocks 52 and 54 may be set to apply a greater or lesser amount of frictional drag in their rotative movement on the bushing 46. In the practice of the present invention, a drag of about 5½ to 6½ pound inches (2.5 to 3 kg cm) has been found to provide an effective friction brake for stopping the web accurately for cutting sheet length, and for providing a sufficient force to rotate the feed roller in the reverse direction in response to initiation of a web being fed from the supply roll to the cutting station 18. Also, this arrangement of the friction brake permits the use of a low power motor and reduces brake wear.

The stop member 38 is provided with an adjusting means in the form of a screw 60 extending between the flanges 42 and 44 and is secured in place by a nut 62. The bearing block 54 of each of the control means 16 and 30 extends to a position between the flanges 42 and 44 of the stop member 40, and by adjusting the screw 60 the flanges 42 and 44 may be flexed inwardly or outwardly from each other to thereby adjust the amount of movement permitted to the bearing blocks 54 before being stopped or arrested by the flanges. Preferably, the amount of movement required of the bearing blocks 54 is between 1/32 and 1/16 inch (0.08 and 0.16 cm) in order to rotate, in the reverse direction, the feed roller 12 or 28 which is not advancing the web to the cutting station 18. This reverse movement of the feed roller is effective to withdraw from the cutting station a lead end of the web last fed a sufficient distance to prevent a thin portion or sliver from being severed from the web during the cutting operation of the other web being severed.

In the operation of the apparatus of the present invention, as the copying machine is actuated by the original to be copied to feed, for example, the web 14 from the supply roll 10, the feed roller 12 is rotatably driven in a direction to advance the web to the cutting station 18. If the immediately preceding sheet was cut from the web 26, the lead end of the web 26 is positioned at the nip of the rotary cutter 34 and the blade 36. Therefore, if a sheet were to be severed from the web 14 with the lead end of the web 26 at the nip, a thin sliver might be cut from the lead end of the web 26 during the severing of the web 14.

However, in the present invention, as the feed roller 12 is rotated it also rotates the control means 16 which is frictionally supported thereon. As the control means 16 rotates, an end 55 of the bearing block 54 strikes a corresponding end 53 of the bearing block 54 associated with the control means 30, thereby rotating the control means 30 in a reverse direction opposite the direction of web feed. Since the control means 30 is frictionally supported on the feed roller 28, the feed roller 28 is also caused to rotate in the reverse direction, a predetermined angular distance as determined by the setting of the stop member 40 which controls the amount of movement permitted to the bearing blocks 54.

As the end 55 of the bearing block 54 of the control means 30 abuts the flange 44 of the stop member 40, the rotative movement of the bearing block 54 is arrested, thereby releasing the frictional drive of the bearing block 54 associated with the control means 16 by acting against the biasing of the springs 58. Thus, the control means 16 and 30 are held against further rotation while the feed roller 12 is permitted to rotate to advance the web 14 to the cutting station 18. Upon completion of the web cutting operation, the feed roller drive is stopped and the web last fed to the cutting station has its lead end positioned at the nip of the rotary cutter and blade 34 and 36 respectively.

If the subsequent sheet is to be cut from the other web or web 26, the operation is the same as described above except that the bearing block 54 of the control means 30 is effective to rotate the control means 16 and the rotative movement thereof is arrested by the flange 42 of the stop member 40. In such event, the lead end of the web 14 would be partially withdrawn from the cutting station 18 to avoid cutting a sliver therefrom during the cutting operation of the web 26.

From the foregoing it will be appreciated that the present invention provides an apparatus that is simple in construction, inexpensive to produce and reliable in operation. The apparatus may be readily adapted to existing machines without requiring major alterations, and provides a positive operating mechanism to eliminate the cutting of slivers from the web which might be carried by the cut sheet through the copying machine and contaminate the developer, the feeder area and other portions of the equipment.

What is claimed is:

1. In combination with an apparatus for selectively feeding a web from either one of a pair of web rolls to a work station, a control means for partially withdrawing from the work station the web last fed thereto, comprising:

a first and second rotatable member each associated with one of the webs, said members adapted to be selectively driven in a forward direction for advancing a web to the work station and a reverse direction for withdrawing a web from the work station;

a first and a second brake means mounted on the first and the second members respectively, and conditionable between a driving position for rotation with the members and a release position for non-rotation relative to the members;

said first brake means co-acting with the second brake means for rotating the second brake means and the second member in the reverse direction in response to the first member being driven in the forward direction; and stop means for conditioning the first brake means to the release position in response to the second member being rotated through a predetermined angular distance and the second brake means being arrested by the stop means.

2. A control means as set forth in claim 1 in which each of the brake means comprises:
  bearing means mounted coaxially of each of the first and the second members; and
  biasing means associated with each of the bearing means for supporting the bearing means in the driving position in frictional drag contact with the rotatable members;
  said bearing means member being adapted to act against the biasing means associated with the bearing means of the other member to reduce the frictional drag of the driven bearing means and condition the same to the release position.

3. In combination with a contact-type copying machine for selectively feeding a web of diazo-type paper from either one of a pair of web supply rolls to a cutting station for severing the web, a friction brake means for partially withdrawing from the cutting station a lead end of a web last fed thereto, comprising:
  a first and a second feed roller each associated with one of the webs, said feed rollers being selectively operable in a forward direction for advancing a web to the cutting station and a reverse direction for retracting the lead end of a web from the cutting station;
  a first and a second friction brake means supported on the first and the second feed rollers respectively, said first and second brake means being conditionable between a driving position for rotation with the feed rollers and a release position wherein rotation thereof relative to the feed rollers is prevented;
  said first friction brake means adapted to engage the second friction brake means and to rotate the same and the second feed roller in the reverse direction in response to driving of the first feed roller; and
  stop means for arresting rotative movement of the second firction brake means in response to the second feed roller being rotated through a predetermined angular distance and for conditioning the first friction brake means to the release position.

4. The combination as set forth in claim 3 in which each of the first and the second friction brake means comprises:
  a bushing secured on a shaft thereof;
  a bearing block supported on said bushing; and
  biasing means for applying a frictional drag to said bearing block to cause the bearing block to be rotated with the feed roller;
  said bearing block on the feed roller being driven acting against and rotating the bearing block on the other feed roller to an arrested position against the stop means for conditioning the driven bearing block to the release position.

5. A method of selectively advancing a web from either one of a pair of web supply rolls to a work station and partially withdrawing from the work station a web last advanced thereto, comprising the steps of:
  supporting each of the webs for transport in a forward direction for advancing a web to the work station and a reverse direction for withdrawing a web from the work station;
  advancing one of the webs in the reverse direction in response to advancement of the other web in the forward direction; and
  arresting transport of the web being advanced in the reverse direction in response to the other web being advanced a predetermined distance in the forward direction.

* * * * *